(12) United States Patent
Criss

(10) Patent No.: US 9,741,034 B1
(45) Date of Patent: Aug. 22, 2017

(54) MANAGEMENT OF REPORTINGS FOR ITEM LISTINGS

(75) Inventor: David A. Criss, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 878 days.

(21) Appl. No.: 13/589,804

(22) Filed: Aug. 20, 2012

(51) Int. Cl.
| | |
|---|---|
| *G06Q 20/40* | (2012.01) |
| *G06Q 30/02* | (2012.01) |
| *G06Q 20/32* | (2012.01) |
| *G06Q 30/00* | (2012.01) |

(52) U.S. Cl.
CPC .................................. *G06Q 20/40* (2013.01)

(58) Field of Classification Search
CPC combination set(s) only.
See application file for complete search history.

(56) References Cited

U.S. PATENT DOCUMENTS

| 7,343,295 | B2* | 3/2008 | Pomerance | 705/309 |
| 7,822,631 | B1* | 10/2010 | Vander Mey et al. | 705/7.29 |
| 2008/0162202 | A1* | 7/2008 | Khanna et al. | 705/7 |
| 2013/0006881 | A1* | 1/2013 | Klemm | 705/319 |
| 2013/0085807 | A1* | 4/2013 | Cincotta | 705/7.32 |
| 2013/0144800 | A1* | 6/2013 | Fallows | 705/341 |

* cited by examiner

*Primary Examiner* — Mark A Fleischer
(74) *Attorney, Agent, or Firm* — Thomas | Horstemeyer, LLP (57) ABSTRACT

Disclosed are various embodiments for managing reportings of item listings for items that are available through an electronic commerce system. A reporting for the item listing is obtained from a merchant, and evaluations of the reporting are obtained from other merchants. A net evaluation of the reporting is generated, and it is determined whether to initiate a correction event based at least in part on the net evaluation of the reporting.

21 Claims, 6 Drawing Sheets

MANAGEMENT OF REPORTINGS FOR ITEM LISTINGS

BACKGROUND

An item, such as a product or data, that is sold through an online marketplace may have an item listing. The item listing may include a title that identifies the item, a description of the item, an image of the item, customer reviews of the item, and possibly other information.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure is directed towards the management of reportings, such as complaints and the like, of item listings for items available through an electronic commerce system. A non-limiting example follows with reference to FIG. 1. Tom, a merchant who sells items through an electronic commerce system, creates an item listing for Acme Widgets. The item listing states the Acme Widgets are compatible with Acme Gizmos, even though Tom knows that Acme Widgets are not compatible with Acme Gizmos.

Figure 1:
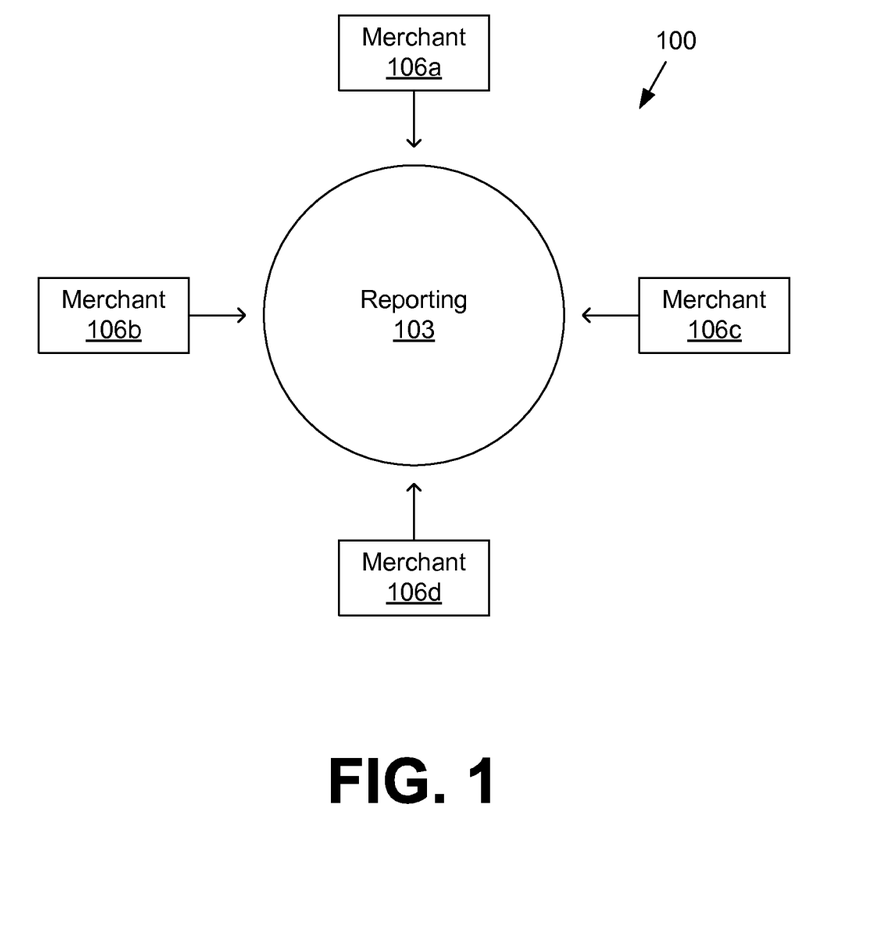
FIG. 1 is a drawing of an example of an evaluation forum according to various embodiments of the present disclosure.

Anne, another merchant who sells items through an electronic commerce system, discovers that the item listing for Acme Widgets includes a misleading description and decides to report a complaint for the item listing. Upon submission of the complaint, the reporting 103 from Anne may be added to an evaluation forum 100 where other complaints are posted.

In the evaluation forum 100, the reporting 103 of the Acme Widgets listing may be evaluated by several merchants 106a-106d. The evaluation from each of the merchants 106a-106b may be weighted by an authority level that is associated with the corresponding merchant. For instance, Bob, a merchant 106 who has sold thousands of items related to Acme Widgets, may have a relatively high authority level. On the other hand, Carl has never sold an item that is related to Acme widgets, so his authority level may be relatively low. The weighted evaluations may be collected and tallied to generate a net evaluation of the reporting 103.

If the net evaluation exceeds a predetermined threshold, a correction event may be initiated. In the present example, the net evaluation of the reporting 103 has exceeded the predetermined threshold for the correction event of suspending the ability for a customer to purchase Acme Widgets through web page that presents the item listing by Tom. Because customers are now unable to purchase Acme Widgets through the misleading item listing, Tom is incentivized to correct the item listing and thereby remove the suspension.

Additionally, the merchants 106a-106d that submitted evaluations of the reporting 103 that were consistent with net evaluation may have their authority levels increased. Similarly, the merchants 106a-106d who submitted evaluations of the reporting 103 that were inconsistent with the net evaluation may have their authority levels decreased. The electronic commerce system that provides the electronic marketplace for the merchants 106a-106d may reward merchants 106a-106d who have high authority levels in various ways.

Therefore, merchants 106a-106d may be incentivized to maintain high-quality item listings. Also, merchants 106a-106d may be encouraged to police the listings of other merchants 106a-106d. In the following discussion, a general description of the system and its components is provided, followed by a discussion of the operation of the same.

Figure 2:
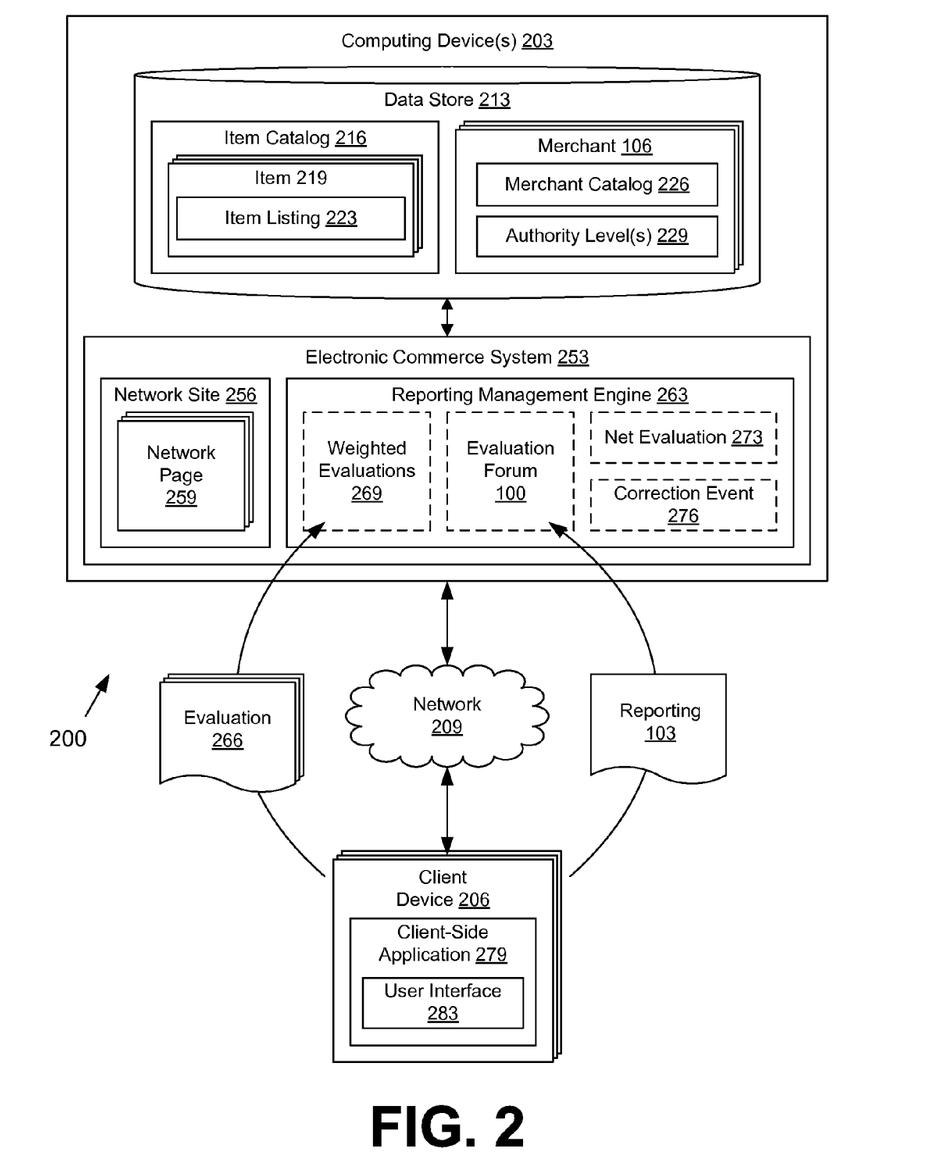
FIG. 2 is a drawing of a networked environment according to various embodiments of the present disclosure.

With reference to FIG. 2, shown is a networked environment 200 according to various embodiments. The networked environment 200 may include one or more computing devices 203, one or more client devices 206, and possibly other devices in data communication through a network 209. The network 209 may include, for example, the Internet, intranets, extranets, wide area networks (WANs), local area networks (LANs), wired networks, wireless networks, any other suitable networks, or any combination thereof.

The computing device 203 may comprise, for example, a server computer or any other system providing computing capability. Alternatively, a plurality of computing devices 203 may be employed that are arranged, for example, in one or more server banks, computer banks, or other arrangements. For example, a plurality of computing devices 203 together may comprise a cloud computing resource, a grid computing resource, and/or any other distributed computing arrangement. Such computing devices 203 may be located in a single installation or may be distributed among many different geographical locations. For purposes of convenience, the computing device 203 is referred to herein in the singular. Even though the computing device is referred to in the singular, it is understood that a plurality of computing devices 203 may be employed in the various arrangements as described above.

Various applications and/or other functionality may be executed in the computing device 203 according to various embodiments. Also, various data may be stored in a data store 213 that is accessible to the computing device 203. The data store 213 may be representative of a plurality of data stores as can be appreciated. The data stored in the data store 213, for example, may be associated with the operation of the various applications and/or functional entities to be described later.

For instance, the data store 213 may include data representing an item catalog 216, the merchants 106a-106d, referred to hereinafter as the merchants 106, and possibly other data. The item catalog 216 may include multiple items 219 that are offered for sale, rental, etc., over the network 209. As non-limiting examples, the items 219 may be physical products, digital media (e.g., digital music, digital video, electronic books, etc.), services, or anything else that may be bought, sold, rented, etc., through the network 209.

Each item 219 may have an item listing 223. The item listing 223 may describe various characteristics of the item 219 with information provided by one or more merchants 106. As non-limiting examples, the item listing 223 may include a title that identifies the manufacturer and model of the item 219, a written description that provides details and describes the item 219, an image of the item 219, and possibly other components. For instance, the item listing 223 may provide a product description, the sizes and colors available for the product, the compatibility of the product with respect to other products, and/or possibly other information. In some embodiments, the item listing 223 may be rendered as part of a web page or other network content for viewing by a customer or a merchant 106. Thus, the item listing 223 in some embodiments may be rendered on a detail page for an item 219.

Each merchant 106 may be, for example, one or more individuals or entities that offer an item 219 for sale, rent, etc., though the network 209. As such, a merchant catalog 226 may be associated with each of the merchants 106 that, for example, references the particular items 219 that are being or have been sold, rented, etc., by the merchant 106.

Additionally, one or more authority levels 229 may be associated with each merchant 106. The authority levels 229 may, for example, reflect a level of experience or expertise for the merchant 106. As such, there may be multiple authority levels 229 for a particular merchant 106, wherein each authority level 229 reflects the experience or expertise for the merchant 106 within a particular category of the items 219. For instance, a merchant 106 that is experienced with consumer electronic devices may have a relatively high authority level 229 with respect to consumer electronic devices, while having a relatively low authority level 229 with respect to gardening tools.

Various factors may be considered when determining the authority levels 229 for the merchants 106. As non-limiting examples, the authority levels 229 may be based at least in part on conversation rates of items 219 associated with a merchant 106, the quantities of items 219 in a merchant catalog 226, ratings of the merchant 106 that have been determined by customers, a quantity of an inventory that has been sold by the merchant 106, a financial value of the inventory that has been sold by the merchant, other factors, or any combination thereof. For instance in some embodiments, the authority levels 229 may be determined by the following equation:

$$L = c_1 f_1 + c_2 f_2 + \ldots + c_n f_n,$$

wherein L represents the authority level 229; $f_1, f_2, \ldots, f_n$ represent the values of the factors being considered for the authority level 229; and $c_1, c_2, \ldots, c_n$ are weighting coefficients corresponding to the factors $f_1, f_2, \ldots, f_n$. Other methods of determining the authority levels 229 may be used as well. Further, one or more factors for the authority levels 229 may be normalized or scaled based at least in part on a conversion rate, a quantity of previously sold inventory, or any other metric associated with a merchant 226. As will be discussed later, the authority levels 229 for the merchants 106 may also be adjusted based at least in part on their interactions with the evaluation forum 100.

The components executed on the computing device 203 include, for example, an electronic commerce system 253 and possibly other applications, services, processes, systems, engines, or functionality not discussed in detail herein. The electronic commerce system 253 may provide an electronic marketplace for the buying, selling, trading, renting, etc., of the items 219. To this end, the electronic commerce system 253 may generate a network site 256 to provide a network presence for the electronic marketplace and for the merchants 106. The network site 256 may encode for display network pages 259 or network content embodied in some other form that facilitate access to the electronic commerce system 253. The network site 256 may include a network page server to serve data such as the network pages 259 to clients, such as the client devices 206, over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The electronic commerce system 253 may also execute a reporting management engine 263 to facilitate the management and processing of reportings 103 submitted by client devices 206 or other devices. A reporting 103 may be, for example, a complaint or other type of submission regarding an item listing 223. As non-limiting examples, a reporting 103 may allege that an item listing 223 includes false or misleading information, is a duplicative item listing 223, is for a prohibited or restricted item 219, contains inappropriate information, fails to adhere to rules set by the electronic commerce system 253, or has any other issue. Non-limiting examples of inappropriate information in an item listing 223 include offensive content, private or personally identifying information, information that reveals an ending to a story (i.e., a "spoiler"), solicitations for positive customer reviews, or other information that may be objectionable.

The reporting management engine 263 may also receive and process evaluations 266 received from the client device 206 or other devices. An evaluation 266 may be, for example, an assessment or judgment of a reporting 103 as determined by a merchant 106 or another individual. As a non-limiting example, an evaluation 266 may indicate that a merchant 106 agrees or disagrees with a reporting 103 that has been submitted to the reporting management engine 263.

The reporting management engine 263 may provide the evaluation forum 100, generate weighted evaluations 269, generate net evaluations 273, initiate correction events 276, and possibly execute additional functionality. The evaluation forum 100 may, for example, provide an electronic environment for the merchants 106 to view and evaluate reportings 103 that have been submitted by other merchants 106. In this sense, the evaluation forum 100 may be, for example, one or more network pages 259 that facilitate submitting and evaluating reportings 103 and evaluations 266.

The weighted evaluations 269 may be a weighting of the evaluations 266 that are based at least in part on the authority levels 229 associated with the merchants 106 that submitted the evaluations 266. As such, a first merchant 106 with a relatively high authority level 229 may submit an evaluation 266 that is attributed a higher weighted evaluation 269 than an evaluation 266 that has been submitted by a merchant with a relatively low authority level 229. By generating the weighted evaluations 269 based on the authority levels 229, the reporting management engine 263 may thereby take into account the experience or expertise of the merchants 106 when processing the evaluations 266.

The net evaluation 273 may be, for example, a collective judgment of a reporting 103 that is based at least in part on the evaluations 266, the weighted evaluations 269, other considerations, and/or any combination thereof. The net evaluations 273 may be used to determine whether to initiate one or more correction events 276 regarding the reporting 103. In various embodiments, the correction event 276 may be, for example, an action that is taken to stimulate corrective action for the item listing 223 by the merchant 106 that is responsible for the item listing 223. As non-limiting examples, a correction event 276 may be associating a visible warning with the item listing 223 so that the warning may be viewed by an offending merchant 106 or customers, suspending or disabling the ability to purchase the item 219 through the item listing 223, adjusting the priority of the reporting 103 with respect to other reportings 103 in a queue for handling by the electronic commerce system 253, adjusting the authority level 229 of the merchant 106 responsible for the item listing 223, submitting a notification to the offending merchant 106, submitting a notification to an agent of the electronic commerce system 253, suspending the item listing 223, suspending the merchant 106 from the electronic commerce system 253, or any other type of action that may encourage correction by the merchant 106 responsible for the item listing 223.

Additionally, each of the correction events 276 may have a trigger threshold for the net evaluation 273 that initiates the correction events 276. For instance, it may be the case that the correction event 276 of posting a warning on the item listing 223 is initiated upon the net evaluation 273 exceeding a first value, while suspending the item listing 223 may be initiated upon the net evaluation 273 exceeding a second value, wherein the second value is greater than the first value. Thus, trigger thresholds for the correction events 276 may correspond to the severity of the correction events 276.

The client device 206 is representative of a plurality of client devices that may be used by the merchants 106 or by customers and that are coupled to the network 209. The client device 206 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The client device 206 may be configured to execute various applications, such as a client-side application 279 and other applications. The client-side application 279 may be executed in the client device 206 for example, to access and render network pages 259, such as web pages, or other network content served up by the computing device 203 and/or other servers. To this end, the client-side application 279 in various embodiments may be embodied as a web browser. The client-side application 279 may also provide a user interface 283 to facilitate interaction with and control of the client-side application 279 and the client-device 206. The client device 206 may also be configured to execute applications beyond the client-side application 279, such as email applications, instant message applications, and/or other applications.

Next, a general description of the operation of the various components of the networked environment 200 is provided. To begin, it is assumed that the data for the item catalog 216 and the merchants 106 have been populated in the data store 213 and that the electronic commerce system 253 has been executed and is running in the computing device 203.

In the course of its interactions with the electronic commerce system 253, a merchant 106 may become aware of a potential issue with an item listing 223 that is under the control of another merchant 106. In response, the merchant 106 may submit a reporting 103 for the potential issue. The electronic commerce system 253 may facilitate submitting a reporting 103 by, for example, providing one or more network pages 259 for the specific purpose of submitting reportings 103. In various alternative embodiments, the network page 259 for the item listing 223 may include a link to the network page 259 that facilitates submitting the reporting 103.

In some embodiments, the electronic commerce system 253 may facilitate submitting the reporting 106 only in the event that a merchant 106 is permitted to submit the reporting 106. As such, the electronic commerce system 253 may determine whether a merchant 106 is permitted to submit a reporting 103 based at least in part on one or more factors. For instance, such a factor may be whether the merchant 106 sells items 219 that are related to a category of the item 219 for the offending item listing 223. As another example, a factor may be whether an authority level 229 for the merchant 106 exceeds a predetermined value. Other factors may be used as well.

The merchant 106 may provide a short description of the purported issue with the item listing 223 that is transmitted with the reporting 103 to the electronic commerce system 253. Additionally, in some embodiments, the merchant 106 may select one or more predetermined categories of reportings 103 that the merchant 106 believes represents the issue being reported. As a non-limiting example, the merchant 106 may select that the item listing 223 includes a misleading description of the item 219.

In response to the reporting 103 being received by the electronic commerce system 253, the reporting management engine 263 may add the reporting 103 to the evaluation forum 100. In various embodiments, the evaluation forum 100 may include other reportings 103 from other merchants 106. As such, merchants 106 may visit the evaluation forum 100 and browse the reportings 103 that have been submitted by other merchants 106. According to some embodiments, the reportings 103 that are visible to the particular merchants 106 may be limited. For instance, it may be the case that only merchants 106 with a relatively high authority level 229 are permitted to view some types of reportings 103. Additionally, the reporting management engine 263 may show only reportings 103 that are related to categories of the items 219 that are in the merchant catalog 226 of the merchant 106.

A merchant 106 may select one of the reportings 103 in the evaluation forum 100 to view and evaluate the reporting 103. To this end, a network page 259 may be generated that displays or links to, for example, the item listing 233, the reporting 103, rules promulgated by the electronic commerce system 253, or any other information that may be of interest to the merchants 106 when evaluating a reporting 103. Such a network page 259 may also facilitate the merchant 106 submitting an evaluation 266 of the reporting 103. For instance, in some embodiments, the network page 259 may generate buttons for the merchant 106 to select that indicate whether the merchant 106 agrees or disagrees with the reporting 103. In alternative embodiments, a slider or other type of mechanism may be provided for the merchant 106 to indicate a level at which the merchant 106 agrees with the reporting 103. In further embodiments, the network page 259 may also facilitate the merchant 106 submitting recommended courses of action that would correct the issue with the item listing 223.

In response to the evaluation 266 being received by the reporting management engine 263, the reporting management engine 263 may generate a weighted evaluation 269 of the reporting 103 based at least in part on the evaluation 266 and the authority level 229 of the merchant 106 that submitted the evaluation 266. For instance, an evaluation 266 submitted by a merchant 106 that has a relatively high authority level 229 with respect to the reporting 103 may have its evaluation 266 weighted relatively heavily. On the other hand, a merchant 106 that has a relatively low authority level 229 with respect to the reporting 103 may have a lower weighting applied to its evaluation 266.

The reporting 103 may be presented to and evaluated by several merchants 106, and several corresponding weighted evaluations 269 may be generated. Using these weighted evaluations 269, the reporting management engine 263 may generate a net evaluation 273 of the reporting 103. To this end, the reporting management engine 263 may, for example, add points to the net evaluation 273 for every weighted evaluation 269 that agrees with the reporting 103, while points are subtracted from the net evaluation 273 for every weighted evaluation 269 that disagrees with the reporting 103. Thus, in some embodiments, the following function may represent a net evaluation 273:

$$N = a_1 e_1 + a_2 e_2 + \ldots + a_n e_n,$$

where N is the net evaluation 273; $a_1, a_2, \ldots, a_n$ are the authority levels 229 for corresponding merchants 106; and $e_1, e_2, e_3, \ldots, e_n$ are the evaluations 266 provided by the merchants 106. An evaluation 266 that agrees with the reporting 103 may have a positive value for $e_1, e_2, \ldots, e_n$, while an evaluation 266 that disagrees with the reporting 103 may have a negative value for $e_1, e_2, \ldots, e_n$. In this function, $a_1 e_1, a_2 e_2, \ldots, a_n e_n$ may represent the weighted evaluations 269 of the reportings 103.

As mentioned above, the reporting management engine 263 may initiate one or more correction events 276 upon the net evaluation 273 exceeding (e.g., becoming greater than) one or more predetermined thresholds. For instance, in response to a first predetermined threshold being exceeded, a first correction event 276 may be initiated to stimulate the merchant 106 that is responsible for the item listing 223 to resolve the issue with the item listing 223. In some embodiments, the first correction event 276 may be, for example, the merchant in charge being notified of the reporting 103.

In the event that the issue with the item listing 223 is not resolved and the net evaluation 273 exceeds a second predetermined threshold, a second correction event 276 that is more severe than the first correction event 276 may be initiated by the reporting management engine 263. For example, the ability to purchase the item 219 for the item listing 223 may be disabled by the reporting management engine 263. Thus, the merchant 106 may be presented with one or more incentives to remedy the reported issue with the item listing 223.

The reporting 103 may become resolved through various events. For example, the merchant 106 that is responsible for the item listing 223 that was reported may take corrective action that is deemed to resolve the reporting 103. In such a case, after taking the corrective action, the merchant 106 may report to the reporting management engine 263 the details of the corrective action. These details may then be presented in the evaluation forum 100 for other merchants 106 to decide whether the issue has been adequately resolved.

In some embodiments, a reporting 103 may be considered resolved after the reporting 103 has been present on the evaluation forum 100 for a predetermined amount of time without the net evaluation 273 reaching a trigger threshold for at least one of the correction events 276. Additionally, a reporting 103 may be deemed resolved in the event that the net evaluation 273 exceeds (e.g., becomes less than) a predefined resolution threshold. The net evaluation 273 may exceed a resolution threshold, for example, in the event that a majority of merchants 106 submit evaluations 266 that disagree with the reporting 103.

The reporting management engine 263 may also update the authority levels 229 of the merchant 106 that submitted the reporting 103 based at least in part on the final net evaluation 273 and/or the resolution of the reporting 103. For instance, if a final net evaluation 273 of a reporting 103 shows that the reporting 103 was appropriate (e.g., a majority of the other merchants 106 agreed that there was an issue with the reported item listing 223), the merchant 106 that submitted the reporting 103 may have its authority level 229 increased. To the contrary, if the net evaluation 273 for a reporting 103 is poor, the authority level 229 of the merchant 106 that submitted the reporting 103 may have its authority level 229 decreased.

Similarly, the reporting management engine 263 may adjust the authority levels 229 of the merchants 106 that submitted the evaluations 266 based at least in part on the final net evaluation 273 and/or the resolution. In some embodiments, for example, the merchants 106 that submitted evaluations 266 that are consistent with the final net evaluation 273 and/or the resolution may have their authority levels 229 increased, while merchants 106 with evaluations 266 that are inconsistent with the final net evaluation 273 and/or the resolution may have their authority levels 229 decreased.

The electronic commerce system 253 may provide incentives for the merchants 106 to desire high authority levels 229. For example, in various embodiments, the item listings 223 and/or network pages 259 associated with the merchants 106 that have high authority levels 229 may include text or an icon (e.g., a badge) that indicates that the merchant 106 has been recognized as having a high authority level 229. Thus, merchants 106 may be incentivized to adequately maintain their item listings 223 and police the item listings 223 of other merchants 106.

Figure 3A:
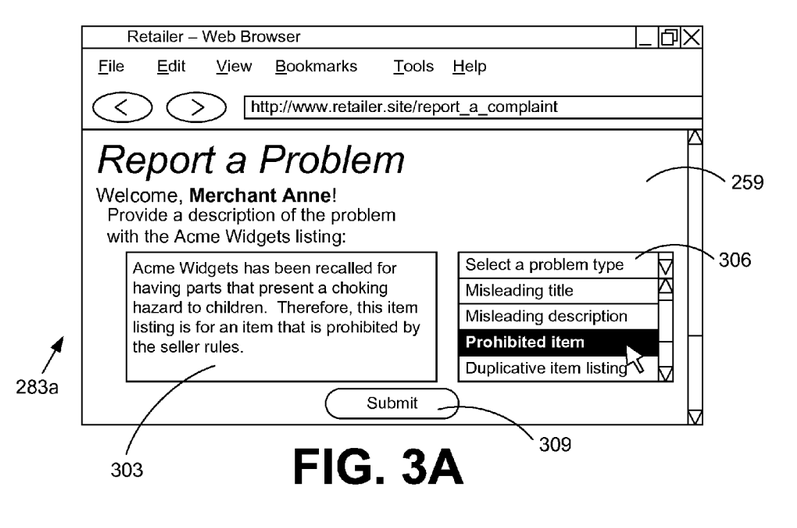
FIG. 3A-3C are drawings of examples of user interfaces rendered by a client device in the networked environment of FIG. 2 according to various embodiments of the present disclosure.

Referring next to FIG. 3A, shown is an example of a user interface 283, referred to herein as the user interface 283a, that may be rendered by the client device 206 (FIG. 2). The user interface 283a shown is merely an example of the many types of user interfaces 283a that may be generated in accordance with the present disclosure. The user interface 283a shown may be, for example, a rendering of a network page 259 generated by the electronic commerce system 253 (FIG. 2) that facilitates a merchant 106 (FIG. 2) submitting a reporting 103 (FIG. 2) to the reporting management engine 263 (FIG. 2). In the present example, Merchant Anne, a merchant 106, is submitting a reporting 103 that complains of the item listing 223 (FIG. 2) for the item 219 (FIG. 2) Acme Widgets.

As shown, the user interface 283a includes a text input region 303, a dropdown list 306, a submit button 309, and other components not discussed in detail herein for brevity. The text input region 303 may facilitate the merchant 106 inputting a short description that describes the alleged issues with the item listing 223. The dropdown list 306 may list several categories of reportings 103 that the merchant 106 may select to identify the type of the issue being submitted. The categories that are selected for inclusion in the dropdown list 306 may, for example, be common issues or issues that are prohibited by the rules set forth by the electronic commerce system 253. Upon selecting the submit button 309, the description provided in the text input region 303, the category of the reporting 103, and possibly other information may be submitted to the reporting management engine 263 as a reporting 103.

Figure 3B:
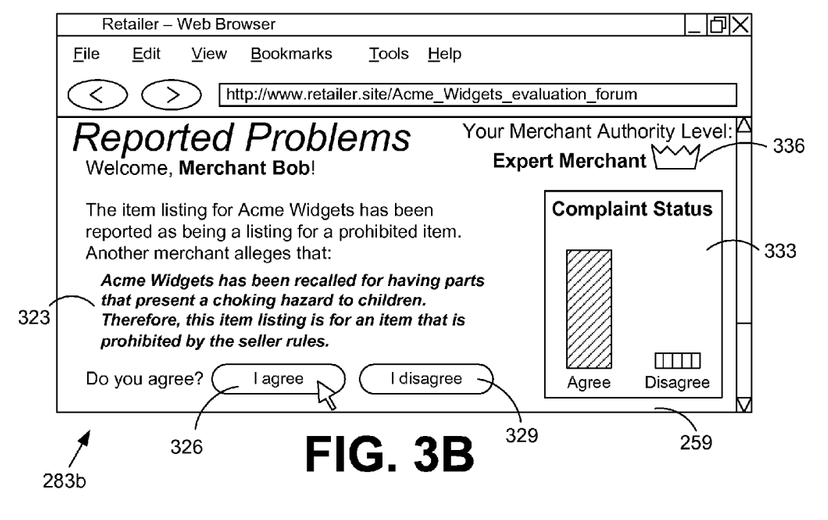

Turning now to FIG. 3B, shown is an example of a user interface 283, referred to herein as the user interface 283b, that may be rendered by the client device 206 (FIG. 2). The user interface 283b shown is merely an example of the many types of user interfaces 283b that may be generated in accordance with the present disclosure. In the present example, the user interface 283b shown may be a rendering of a network page 259 generated by the electronic commerce system 253 (FIG. 2) that presents a reporting 103 (FIG. 2) and facilitates a submission of an evaluation 266 (FIG. 2). In the present example, Merchant Bob, a merchant 106, is reviewing the reporting 103 that was submitted by Merchant Anne in the discussion above with respect to FIG. 3A.

The user interface 283b shown includes a reporting description region 323, an agree button 326, a disagree button 329, a reporting status region 333, an authority level indicator 336, and other components not discussed in detail herein for brevity. The reporting description region 323 may include the short description that was input by the merchant 106 in the text input region 303 (FIG. 3A). Thus, the reporting description region 323 may describe the reporting 103 so that merchants 106, including Merchant Bob, may determine an evaluation 266. The agree button 326 may be selected by the merchant 106 in the case in which the merchant 106 agrees with the reporting 103. To the contrary, the disagree button 329 may be selected in the event that the merchant 106 disagrees with the reporting 103. Upon selecting the agree button 326 or the disagree button 329, the corresponding evaluation 266 may be submitted to the reporting management engine 263.

The reporting status region 333 in the present example shows a visual representation of the net evaluation 273 (FIG. 2). In some embodiments, the reporting status region 333 may be omitted, as it may be desirable for the net evaluation 273 to be hidden from the merchants 106 that are submitting evaluations 266. The authority level indicator 336 may be, for example, text and/or an icon (e.g., a badge) that shows to merchants 106 and customers that the particular merchant 106 has been recognized as having a high authority level 229.

Figure 3C:
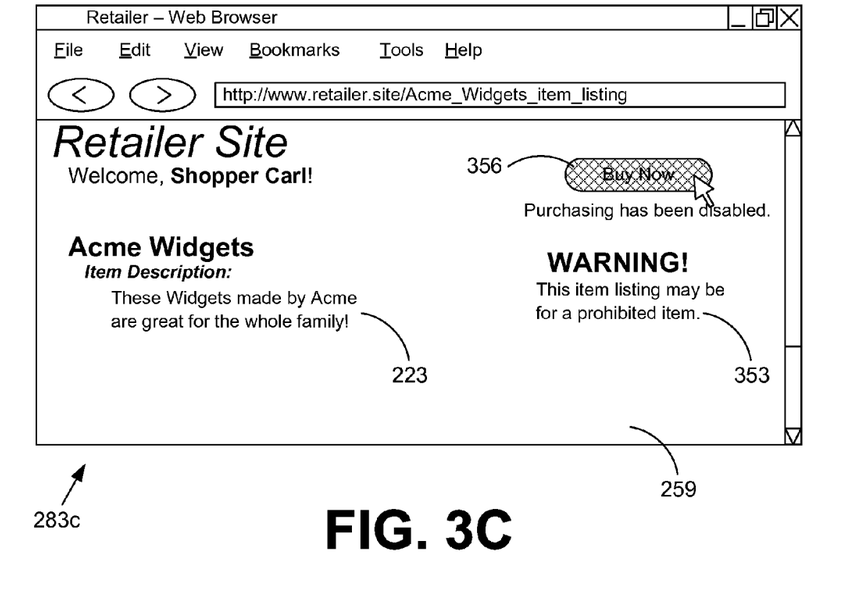

Turning now to FIG. 3C, shown is an example of a user interface 283, referred to herein as the user interface 283c, that may be rendered by the client device 206 (FIG. 2). The user interface 283c shown is merely an example of the many types of user interfaces 283c that may be generated in accordance with the present disclosure. In the present example, the user interface 283c shown may be a network page 259 that is generated, for example, in response to a net evaluation 273 (FIG. 2) exceeding a threshold to initiate a correction event 276 (FIG. 2). In particular, the correction event 276 initiated in the present example is a suspension of the ability to purchase an item 219 (FIG. 2) in conjunction with the item listing 223 and a warning being associated with the item listing 223.

The user interface 283c includes the item listing 223, a warning 353, a buy button 356, and other components not discussed in detail herein for brevity. As previously mentioned, the item listing 223 may include a title, a description, and/or possibly other information. The warning 353 in the present example informs a customer that there may be an issue with the item 219 and/or item listing 223. In the present example, the buy button 356 has been disabled (e.g., "greyed out") and is unable to be selected by a customer.

Figure 4:
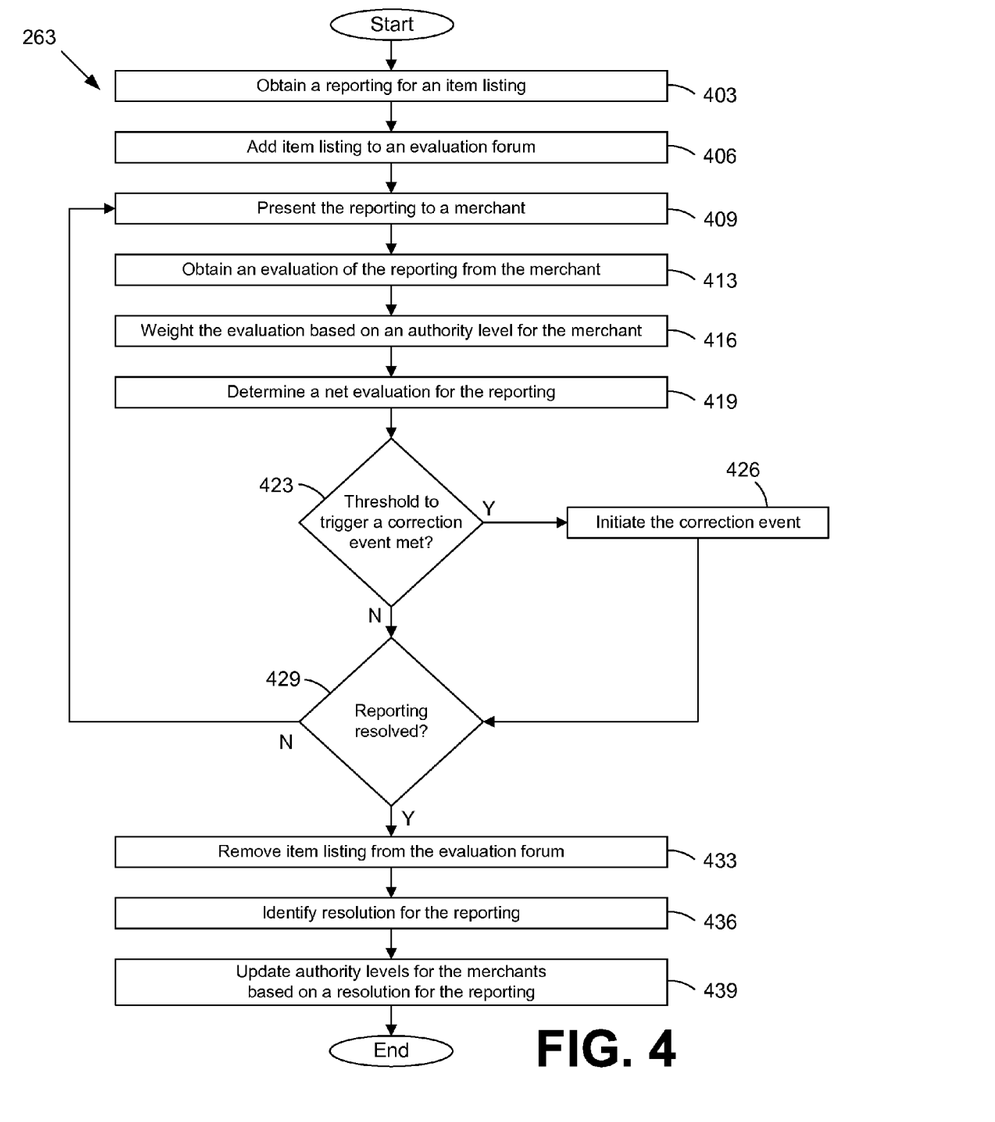
FIG. 4 is a flowchart illustrating one example of functionality implemented as portions of a reporting management engine executed in a computing device in the networked environment of FIG. 2 according to various embodiments of the present disclosure.

Referring next to FIG. 4, shown is a flowchart that provides one example of the operation of a portion of the reporting management engine 263 according to various embodiments. It is understood that the flowchart of FIG. 4 provides merely an example of the many different types of functional arrangements that may be employed to implement the operation of the portion of the reporting management engine as described herein. As an alternative, the flowchart of FIG. 4 may be viewed as depicting an example of steps of a method implemented in the computing device 203 (FIG. 2) according to one or more embodiments. The flowchart of FIG. 4 depicts an example of the reporting management engine 263 receiving a reporting 103, adding the reporting 103 to the evaluation forum 100, receiving evaluations 266, and determining whether to initiate correction events 276 based at least in part on the evaluations 266.

Beginning with block 403, the reporting management engine 263 obtains a reporting 103 (FIG. 1) for an item listing 223 (FIG. 1) from a client device 206 (FIG. 2). In block 406, the item listing 223 is added to the evaluation forum 100, and the reporting 103 is presented to a merchant 106 using another client device 206, as shown in block 409. In some embodiments, the reporting management engine 263 may identify particular merchants 106 that are associated with an item category corresponding to the item listing 223 and present the reporting 103 to only those identified merchants 106.

In block 413, an evaluation 266 (FIG. 2) for the reporting 103 is obtained from the merchant 106. As shown in block 416, the evaluation 266 is then weighted to generate a weighted evaluation 269 based at least in part on the authority level (FIG. 2) for the merchant 106. Next, the reporting management engine 263 moves to block 419 and determines a net evaluation 273 (FIG. 2) for the reporting 103 based at least in part on the weighted evaluation 269.

Thereafter, the reporting management engine 263 determines whether a threshold to trigger a correction event 276 (FIG. 2) has been met, as shown in block 423. If the threshold has not been met, the reporting management engine 263 moves to block 429. If the threshold has been met, the correction event 276 is initiated in block 426, and then the reporting management engine 263 moves to block 429. In block 429, it is determined whether the reporting 103 has been resolved. If the reporting 103 has not been resolved, the reporting management engine 263 returns to block 409 and the process is repeated as shown. If the reporting 103 has been resolved, the reporting management engine 263 moves to block 433 and removes the item listing 223 from the evaluation forum 100. As shown in block 436, the particular resolution is identified by the reporting management engine 263, and the authority levels 229 for the merchants 106 are updated based at least in part on their corresponding evaluations 266, as shown in block 439. Thereafter, the process ends.

Figure 5:
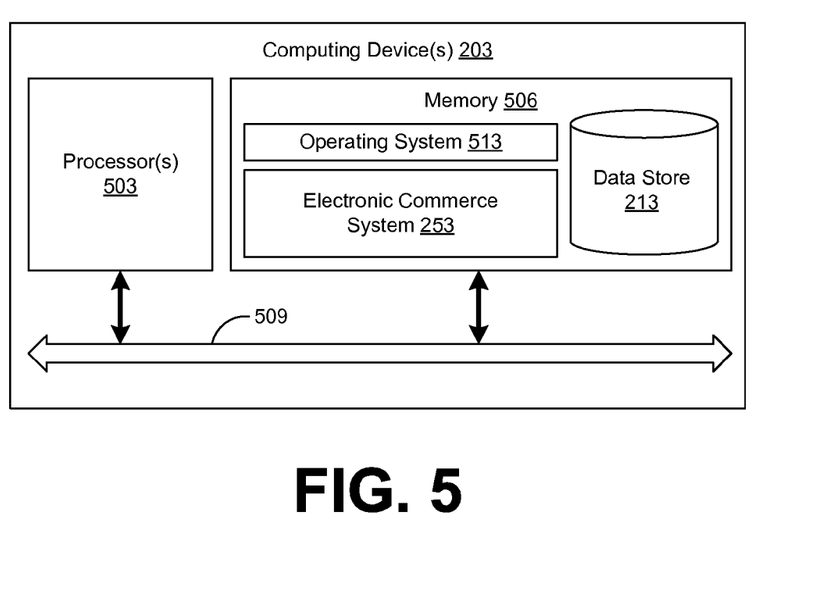
FIG. 5 is a schematic block diagram that provides one example illustration of a computing device employed in the networked environment of FIG. 2 according to various embodiments of the present disclosure.

With reference to FIG. 5, shown is a schematic block diagram of the computing device 203 according to an embodiment of the present disclosure. The computing device 203 includes at least one processor circuit, for example, having a processor 503 and a memory 506, both of which are coupled to a local interface 509. To this end, the computing device 203 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is the electronic commerce system 253 and potentially other applications. Also stored in the memory 506 may be the data store 213 and other data. In addition, an operating system 513 may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 209 (FIG. 2) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 253 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the reporting management engine 263. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 253, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions, that, when executed by a computing device, cause the computing device to at least:
   obtain, from a first merchant computing device associated with a first merchant, a reporting for an item listing for an item offered for sale through an electronic commerce system, wherein the item listing includes information created by a second merchant computing device associated with a second merchant, and wherein the reporting comprises a complaint for the item listing;
   present, via an electronic evaluation forum, the reporting to a plurality of other merchant computing devices associated with a plurality of other merchants associated with an item category that is associated with the item for the item listing;
   obtain a plurality of evaluations of the reporting from the plurality of other merchant computing devices via at least one network page comprising at least one user interface that facilitates submitting and evaluating the reporting;
   weight the plurality of evaluations based at least in part on a plurality of authority levels associated with the plurality of other merchants to generate a plurality of weighted evaluations, wherein the plurality of authority levels correspond to a respective level of expertise for respective ones of the plurality of other merchants, the plurality of authority levels being based at least in part on at least one of:
      a rating of at least one of the plurality of other merchants determined by a plurality of customers;
      a sold inventory quantity;
      a financial value of a sold inventory; or
      an item conversion rate;
   generate a net evaluation of the reporting based at least in part on the plurality of weighted evaluations; and
   determine to initiate at least one of a plurality of correction events based at least in part on the net evaluation of the reporting, wherein at least one of the correction events comprises at least one of:
      adjusting a priority of the reporting relative to a plurality of other reportings;
      modifying a user interface including the item listing by adding a warning in conjunction with the item listing; or
      disabling an ability to purchase the item via the electronic commerce system in conjunction with the item listing.

2. The non-transitory computer-readable medium of claim 1, wherein the plurality of computer instructions further cause the computing device to at least:
   identify a resolution for the reporting; and
   increase the plurality of authority levels for the plurality of other merchants associated with the plurality of other merchant computing devices that submitted the plurality of evaluations that are consistent with the net evaluation.

3. The non-transitory computer-readable medium of claim 1, wherein the plurality of computer instructions further cause the computing device to at least stop obtaining at least one additional evaluation of the reporting in response to an occurrence of a predefined event that comprises at least one of:
   the net evaluation exceeding a predetermined lower limit; or
   an expiration of a predetermined amount of time.

4. The non-transitory computer-readable medium of claim 1, wherein the at least one of a plurality of correction events is initiated when the net evaluation of the reporting exceeds a predetermined threshold.

5. A system, comprising:
   at least one computing device; and
   a plurality of computer instructions executable in the at least one computing device, wherein the plurality of computer instructions cause the at least one computing device to at least:
      present, via an electronic evaluation forum, a reporting for an item listing associated with a first merchant to a plurality of other merchants, wherein the item listing comprises a description of an item available for sale through an electronic commerce system;
      obtain a plurality of evaluations of the reporting from the plurality of other merchants via at least one network page comprising at least one user interface that facilitates submitting and evaluating the reporting;
      determine a net evaluation of the reporting based at least in part on the plurality of evaluations from the plurality of other merchants; and
      determine to initiate a correction event associated with the item being available for sale through the electronic commerce system based at least in part on the net evaluation of the reporting, the correction event comprising at least one of: disabling of an ability to purchase the item via the electronic commerce system, adjusting a priority of the reporting relative to a plurality of other reportings, or modifying an item listing user interface that includes the item listing.

6. The system of claim 5, wherein the plurality of computer instructions further cause the at least one computing device to at least receive the reporting from an additional merchant.

7. The system of claim 6, wherein the plurality of computer instructions further cause the at least one computing device to at least determine that the additional merchant is permitted to submit the reporting based at least in part on an item category.

8. The system of claim 5, wherein the plurality of computer instructions further cause the at least one computing device to at least:
   weight the plurality of evaluations based at least in part on a plurality of authority levels associated with the plurality of other merchants that submit the plurality of evaluations, thereby generating a plurality of weighted evaluations; and wherein the net evaluation of the reporting is further based at least in part on the plurality of weighted evaluations.

9. The system of claim 5, wherein the plurality of computer instructions further cause the at least one computing device to at least determine to initiate the correction event further based at least in part on whether the net evaluation of the reporting exceeds a predetermined threshold.

10. The system of claim 5, wherein the plurality of computer instructions further cause the at least one computing device to at least:
   identify an item category that corresponds to the item listing;
   identify the plurality of other merchants among a plurality of additional merchants for being associated with the item category that corresponds to the item listing; and
   present the reporting to the plurality of other merchants that are identified.

11. The system of claim 5, wherein the plurality of computer instructions further cause the at least one computing device to stop receiving the evaluations for the item listing from the plurality of other merchants in response to an occurrence of a predefined event.

12. The system of claim 11, wherein the predefined event is an expiration of a predetermined amount of time.

13. The system of claim 11, wherein the predefined event is the net evaluation exceeding a predetermined limit.

14. The method of claim 13, wherein the reporting is obtained from an additional merchant, and further comprising determining that the additional merchant is permitted to submit the reporting.

15. A method, comprising:
   obtaining, in at least one computing device, a reporting for an item listing for an item available through an electronic commerce system, wherein the item listing is associated with a first merchant;
   obtaining, in the at least one computing device, a plurality of evaluations of the reporting from a plurality of other merchants associated with the electronic commerce system via at least one network page comprising at least one user interface that facilitates submitting and evaluating the reporting;
   generating, in the at least one computing device, a net evaluation of the reporting based at least in part on the plurality of evaluations of the reporting; and
   determining, in the at least one computing device, whether to initiate a correction event based at least in part on the net evaluation of the reporting, wherein the correction event comprises at least one of:
      adjusting a priority of the reporting relative to a plurality of other reportings,
      disabling an ability to purchase the item through a network page associated with the item listing, or
      modifying a user interface including the item listing by adding a warning in conjunction with the item listing.

16. The method of claim 15, further comprising weighting, in the at least one computing device, the plurality of evaluations based at least in part on a plurality of authority levels for the plurality of other merchants, thereby generating a plurality of weighted evaluations; and
   wherein determining the net evaluation of the reporting is further based at least in part on the plurality of weighted evaluations.

17. The method of claim 16, further comprising:
   identifying, in the at least one computing device, a resolution of the reporting based at least in part on the net evaluation; and
   updating, in the at least one computing device, the plurality of authority levels for the plurality of other merchants based at least in part on the resolution of the reporting.

18. The method of claim 16, wherein the plurality of authority levels for the plurality of other merchants are based at least in part on a merchant rating that is determined by a plurality of customers for respective ones of the plurality of other merchants.

19. The method of claim 16, wherein the plurality of authority levels for the plurality of other merchants are based at least in part on a plurality of sold inventory quantities associated with the plurality of other merchants.

20. The method of claim 16, wherein the authority levels for the plurality of other merchants are based at least in part on a plurality of financial values of a plurality of sold inventory quantities associated with the plurality of other merchants.

21. The method of claim 15, wherein the correction event comprises associating a warning with the item listing, the warning indicating that the reporting has been obtained by the at least one computing device.

* * * * *